United States Patent Office 3,579,355
Patented May 18, 1971

3,579,355
MULTILAYERED GELATIN CONTAINING DESSERTS
Clement R. Wyss, Scarsdale, Robert Cassanelli, Yorktown Heights, and Joseph Russo, Irvington, N.Y., assignors to General Foods Corporation, White Plains, N.Y.
No Drawing. Continuation-in-part of application Ser. No. 783,738, Dec. 13, 1968. This application Oct. 22, 1969, Ser. No. 868,578
Int. Cl. A23l 1/04
U.S. Cl. 99—130                                    8 Claims

ABSTRACT OF THE DISCLOSURE

Dry composition comprising a combination of gelatin and fat, sugar and an emulsifier for the fat which upon successive whipping with water at various temperatures produces a 2 or 3 layered multitextured gelatin dessert when the product cools.

---

This application is a continuation-in-part of our copending application Ser. No. 783,738, filed Dec. 13, 1968, and now abandoned.

The invention relates to powdered whippable dessert compositions for use in making differently colored multilayered gelatin containing desserts and methods of preparing the same.

The invention further relates to multilayered gelatin containing desserts having (1) a lower layer which substantially resembles gelatin dessert in texture and appearance, and having a high ratio of gelatin to fat and a creamy or aerated fatlike upper layer having a low ratio of gelatin to fat; and (2) multilayered gelatin containing desserts having a lower layer which substantially resembles gelatin dessert in texture and appearance, and having a high ratio of gelatin to fat, a middle layer having a custardlike texture and appearance and a ratio of gelatin to fat less than that of the upper layer, and an upper layer having an aerated creamy fat or whipped foamy topping like appearance, and a ratio of gelatin to fat higher than that of the middle layer, but less than that of the bottom layer.

The invention relates still further to processes of preparing differently colored multilayered, multitextured, gelatin containing desserts from single package powdery dessert mixes.

Stratified gelatin desserts having differently colored layers are of the utmost decorative and aesthetic importance to the culinary art, however, utilizing gelatin dessert mixes presently on the market necessitates pouring these mixes into containers and allowing them to set before pouring additional gelatin dessert mixes to form the desired differently colored successive layers. This method of preparing stratified gelatin desserts is inconvenient and costly due to the necessity of employing more than one package of dessert mix and the enormous amount of time, labor, and refrigeration which this method obviously consumes. Moreover, the stratified desserts prepared by the foregoing method has uniformly textured, rather than multitextured strata or layers.

Powdered dessert mixes comprising dried emulsions which include fat, an emulsifier for the fat, fat encapsulating solids, and gelatin, are disclosed in British Pat. No. 1,072,768. The hydrophilic fat encapsulating solids are either proteinaceous materials or mixtures of proteinaceous and carbohydrate materials.

In the process of preparing the dessert compositions of British Pat. No. 1,072,768, the gelatin is incorporated in a slurry containing the fat emulsifier and encapsulating solid and the entire slurry containing the gelatin is then dried, preferably by spray drying. The recipe for preparing these desserts produces aeration by whipping prior to gelation, and the encapsulated fat, globules tend to stabilize the dessert compositions formed when the gelatin sets.

It is an object of this invention to provide one package dry gelatin containing dessert mixes which produce attractive two or three layered desserts upon mixing with water and whipping.

Another object of this invention is to provide multilayered, multitextured gelatin containing desserts having (1) a lower layer which substantially resembles gelatin dessert in texture and appearance and having a high ratio of gelatin to fat, and a creamy or aerated fatlike upper layer having a low ratio of gelatin to fat; and (2) multilayered gelatin containing desserts having a lower layer which substantially resembles gelatin dessert in texture and appearance and having a high ratio of gelatin to fat, a middle layer having a custardlike texture and appearance, and a ratio of gelatin to fat less than that of the upper layer, and an upper layer having an aerated creamy fatty or whipped foamy topping like appearance, and a ratio of gelatin to fat higher than that of the middle layer, but less than that of the bottom layer.

A still further object is to provide processes for preparing differently colored multilayered, multitextured gelatin containing desserts.

Other objects and advantages of the invention will become apparent from the following descriptions.

It has been discovered that when a dry mix comprising a gelatin portion and a fat portion in which the fat is either in chip form or plated on sugar, is whipped with water under conditions which are hereinafter described, the whipped mixture separates into a colorful two or three layered dessert; wherein the ratios of gelatin to fat are highest in the lower layers of either dessert, and wherein the ratio of gelatin to fat in the upper layers of the three layered dessert is higher than that of the middle layer but less than that of the bottom layer. The dry mix per se will contain combined totals of about 12 to 18 by weight of gelatin and fat, and the weight ratio of gelatin to fat in said mixture will be about 1 to 2.

The particular edible fats to be incorporated in the dessert composition according to this invention may be edible oils, semisolid or solid fats, or combinations thereof. These fats for example are the usual shortenings such as lard, modified lard, butter, margarine, and various animal and vegetable oil. Representative of the latter are the hydrogenated and nonhydrogenated forms of coconut oil, palm kernel oil, cottonseed oil, peanut oil, olive oil, sunflower seed oil, sesame seed oil, corn oil, safflower oil, poppyseed oil, soybean oil and the like.

In addition to the fat itself, the fat portion of the present composition includes various flavors and emulsifying agents for the fat. Representative of such emulsifying compounds are lecithin, the mono and diglycerides of fat forming fatty acids, such as mono and diolein monostearin, and dipalmitin; polyoxyalkylese ethers of fatty esters of polyhydric alcohols, such as the polyoxyethylese ethers of sorbitan distearate; mono- and diesters of glycols and fatty acids such as propylene glycol monostearate; and partial esters of carboxylic acids such as lactic, citric, and tartaric acids with mono and digylcerides of fatty acids, such as glycerol lactopalmitate. The fatty acids used to prepare the emulsifiers include those derived from beef tallow and castor, coconut, cottonseed, mustard seed, palm, peanut, rapeseed, rice bran, soybean, tall and marine oil.

Moreover, the fat portion should exhibit a plastic range after whipping with the gelatin portion according to the recipe hereinafter described, such that it will melt readily at or about mouth temperature. More particularly, the fat portion should show a rapid decrease in solids content over a range between room temperature and body temperature. Thus, it is desirable that between 70° F. and 100° F. there be a sharp drop in the solids content index of the fat portion. The fat portion employed in this invention will preferably have a solids content of about 65.3 percent at 50° F., and a solids content of about 1.8 percent at 110° F. The Wiley melting point range of the fat portion is between about 99° F. and 114° F.

Suitable sugars for use in the invention include any of the commonly used sugars, including sucrose, dextrose, maltose, fructose and lactose, as well as mixtures of these sugars or artificial sweeteners.

The whippable gelatin containing desserts may also contain other ingredients such as flavoring agents, dyes or colorants, lecithin or hydroxylated lecithin, and food acids such as citric acid, fumaric acid and adipic acid, as well as, vitamins, minerals and the like.

The most preferred way of making the one package whippable gelatin containing dessert mixes is by mixing about one part of the fat portion with about five parts of sugar and reducing the fat/sugar admixture to a homogeneous powder so that the fat is plated on the sugar particles. This fat/sugar admixture is then mixed with about three parts of additional sugar and about one part of the dry gelatin portion to obtain the final single package powdered mixture.

The one package whippable gelatin containing dessert mixes may also be prepared by mixing about 30% of the sugar and about ⅔'s of the fat portion and reducing the mixture to a homogeneous powder. The resulting powder is then mixed with the remaining fat portion and the mixture is treated so that the fat portion is in the form of chips. The resulting mixture containing fat chips is then added to a package containing the remaining sugar and the gelatin portion to form a single package mix.

Each of the wide variety of ingredients employed in preparing the single package gelatin containing powdery admixtures of this invention function in a unitary manner to provide the differently colored multilayered, multitextured, gelatin containing desserts upon whipping with water following the recipes to be hereinafter described.

Thus, sugar (sucrose) is the sweetening agent. Hydrogenated vegetable and coconut oil are fats which contribute to whipping and formation of the upper layer as well as providing the requisite texture, mouthfeel, flavor and appearance. Gelatin assists in setting the nonfat portion of the product by contributing to texture, mouthfeel, and gel characteristics, and also to the whippability characteristics. Adipic and fumaric acids provide the "sour bite" essential for good flavor, and in conjunction with gelatin, controls optimum gel texture. Guar gum functions as a thickener and serves to reduce splattering during whipping. Sodium citrate is a buffer which is empolyed to maintain the acidity of the gelatin portion within a range for optimum gel formation. Polyglycerol esters of fatty acids and lecithin are emulsifier combinations which, due to their varying degrees of affinity for water and fat, facilitate whipping and separation of the mixture into well-defined separate layers. These emulsifiers also control the rate, amount and type of upper layer, and, therefore directly influence its texture. The natural and artificial flavors are added to provide the fruit taste in the gelatin and the creamy taste in the upper stratified layers. U.S. certified color is added for appearance, and ethyl maltol enhances the flavors.

The range of ingredients utilized in the powdery mixtures employed to prepare multilayered gelatin containing desserts are exemplified in the following example:

EXAMPLE I

| | Percent |
|---|---|
| Sugar (sucrose) | 75.0–85.0 |
| Gelatin portion: | |
|     Fumaric acid | 0.3–0.5 |
|     Guar gum | 0.6–0.9 |
|     Gelatin | 5.0–7.0 |
|     Adipic acid | 1.0–1.5 |
|     Trisodium citrate | 0.5–0.7 |
| Strawberry flavor (GS–8) ⎫ | |
| Strawberry shade (SS–6) ⎬ flavor and color | 0.15–0.25 |
| Ethyl maltol ⎭ | |
| Fat portion: | |
|     Hydrogenated vegetable oil | 7.0–11.0 |
|     Polyglycerol esters of fatty acids | 0.05–1.0 |
|     Diglycerol monostearate | — |
| Lecithin (Actiflo 68–SB) | 0.02–0.3 |
| Vanillin ⎫ | |
| Anisic Aldehyde ⎬ | 0.05–0.06 |
| Piperonal ⎭ | |

The fat, emulsifiers and flavors are heated to about 140° F. in a mixing tank. Next, about one part of the melted fat portion and about five parts of granulated sugar are simultaneously added to a liquid/solid continuous mixing device to form a fat/sugar paste. The resulting paste is then fed into a 5-roll refiner where it is crushed to a relatively dry fat/sugar powder, in which the fat is plated on the sugar. The fat/sugar powder is cooled to about 45° F., and then ground into a homogeneous mixture in a Fitz Mill. Next, the homogeneous fat/sugar powder is blended in a solids mixer with about three parts of additional granulated sugar and about one part of the dry gelatin portion, and packaged for storage.

EXAMPLE II

The fats, emulsifiers and flavors of Example I are heated to about 140° F. in a mixing tank. About 30% of the sugar and about ⅔'s of the fat/emulsifier/flavor mix is then added to a Ribbon Mixer and blended thoroughly to form a paste. The resulting paste in then fed into a 5-roll refiner, whereupon the refined dry mix is placed in an emulsifier mixer with the remainder of the fat and blended at 130° F. for about three hours. The blended material is then fed into a chip depositor where separate fat chips are produced. These chips are then added to a package containing the remaining sugar and gelatin portion.

Recipe directions for producing multilayered, multitextured gelatin desserts are as follows:

EXAMPLE III

About 1.3 (may use 1 to about 1.5 parts) parts of boiling water is added to about one part of a gelatin/fat admixture prepared according to Example I, in order to melt the fats and solubilize the gelatin. Next, the mixture is blended at the low speed of the electric mixer or with a hand rotary beater for about 30 seconds to form an emulsion. The emulsion is then whipped vigorously or at high speed for about four minutes (whipping less than four minutes results in an insufficiently aerated top layer). During whipping the temperature of the emulsion drops, and the fats begin to solidify within the range for optimum whipping. Next, the mixer speed is reduced to low or gentle stirring and about 2.6 (may use 2 to about 3 parts) parts of cold tap water is added, and blended into the mixture. The mixture is then poured into dessert dishes and chilled at temperatures below about 50° F. whereupon it gradually separates into a colorful three layered dessert having a lower layer which substantially resembles gelatin dessert in texture and appearance and having a high ratio of gelatin to fat, a middle layer having a custardlike texture and appearance and a ratio of gelatin to fat less than that of the upper layer, and an upper layer having an aerated creamy fat or whipped foamy topping like appearance, and a ratio of gelatin to fat higher than that of the middle layer but less than that of the bottom layer.

An analysis of the various layers disclosed the following:

Gelatin (percent): top, 1.28; middle, 1.11; bottom, 1.17.

Fat (percent): top, 2.62; middle, 4.23; bottom, 0.15.

Carbohydrate (percent): top, 11.40; middle, 8.60; bottom, 8.00.

EXAMPLE IV

Same as Example III employing 2.6 parts of boiling water, in lieu of cold tap water, to produce a two layered dessert having a lower layer which substantially resembles gelatin dessert in texture and appearance and having a high ratio of gelatin to fat, and a creamy or aerated fat-like upper layer having a low ratio of gelatin to fat.

It is understood that many art known dessert ingredients or food additives may be employed in our dessert mixture without departing from the scope of the invention. Thus, if a quicker whipping nonrotary hand mixed multilayered gelatin containing dessert is contemplated or desired, the ingredient line of the powdery composition would be modified to include a higher bloom gelatin, larger quantities of fat, and increased emulsifier levels. Such modifications would enable the final multilayered gelatin containing dessert to set at temperatures close to ambient temperatures, however, the product quality which includes distinct demarcation between layers is generally inferior. Moreover, while the preferred ratios of gelatin to fat in the three layered dessert are about 7:1 in the lower layer, about 1:4 in the middle layer, and about 1:2 in the upper layer, variations from these ratios will not depart from the essence of the invention.

Having described in detail the preferred embodiment of the invention, and the manner of practicing the same, it is to be understood to those skilled in the art to which the invention pertains, that many changes, embodiments, and applications will suggest themselves without departing from the scope of the invention. Accordingly, the disclosure and description herein are merely illustrative and are not intended to be limiting in any sense.

What is claimed is:

1. A dry whippable composition for preparing a multilayered, multi-textured gelatin-containing dessert comprising combined totals of about 12% to 18% by weight of gelatin and fat, wherein the ratio of gelatin to fat in said mixture is about 1 to 2, 75% to 85% by weight of sugar, and 0.07% to 1.3% by weight of emulsifier for the fat, whereby upon successive whipping of the mix with water at various temperatures, a 2 or 3 layered multitextured gelatin-containing dessert is formed when the product cools.

2. A dry whippable composition according to claim 1, wherein the fat is an emulsified mixture comprising hydrogenated vegetable oil and hydrogenated coconut oil.

3. A process of preparing a two-layered, multitextured gelatin-containing dessert, comprising (1) adding about 1.3 parts of boiling water to about one part by weight of a powdery admixture comprising combined totals of about 12 to 18% by weight of gelatin and fat, wherein the ratio of gelatin to fat in said mixture is about 1 to 2, 75% to 85% by weight of sugar, and 0.07% to 1.3% by weight of emulsifier, (2) blending the mixture at low speed of an electric mixer or rotary hand beater for about 30 seconds, (3) whipping the mixture at high speed for about 4 minutes, (4) reducing to low speed and blending in about 2.6 parts by weight of boiling water based on 1 part of the powdery admixture and (5) chilling the mixture.

4. A process of preparing a three-layered, multitextured gelatin-containing dessert comprising (1) adding about 1.3 parts of boiling water to about one part by weight of a powdery admixture comprising combined totals of about 12 to 18% by weight of gelatin and fat, wherein the ratio of gelatin to fat in said mixture is about 1 to 2, 75% to 85% by weight of sugar, and 0.07% to 1.3% by weight of emulsifier, (2) blending the mixture at low speed of an electric mixer or a rotary hand beater for about 30 seconds, (3) whipping the mixture at high speed for about 4 minutes, (4) reducing to low speed and blending in about 2.6 parts by weight of cold water based on 1 part of the powdery admixture, and (5) chilling the mixture.

5. A process of preparing a two-layered, multitextured gelatin-containing dessert, comprising (1) adding about 1 to 1.5 parts of boiling water to about 1 part by weight of a powdery admixture comprising combined totals of about 12 to 18% by weight of gelatin and fat, wherein the ratio of gelatin to fat in said mixture is about 1 to 2, 75% to 85% by weight of sugar, and 0.07% to 1.3% by weight of emulsifier, (2) dissolving said mixture into said water by gentle stirring for at least 30 seconds to form an emulsion, (3) whipping said emulsion over a period of at least 4 minutes to aerate said emulsion, and (4) adding 2 to 3 parts by weight of boiling water based on 1 part of the powdery admixture while gently stirring.

6. The process of claim 5, wherein the aerated emulsion is chilled below about 50° F.

7. A process of preparing a three-layered multitextured gelatin-containing dessert comprising (1) adding about 1 to 1.5 parts of boiling water to about 1 part by weight of a powdery admixture comprising, combined totals of about 12 to 18% by weight of gelatin and fat wherein the ratio of gelatin to fat in said mixture is about 1 to 2, 75% to 85% by weight of sugar, and 0.07% to 1.3% by weight of emulsifier, (2) dissolving said mixture into said water by gentle stirring for at least 30 seconds to form an emulsion, (3) whipping said emulsion over a period of at least 4 minutes to aerate said emulsion, and (4) adding 2 to 3 parts by weight of cold water based on 1 part of the powdery admixture while gently stirring.

8. The process of claim 7, wherein the aerated emulsion is chilled below about 50° F.

References Cited

UNITED STATES PATENTS

| 3,199,988 | 8/1965 | Kozlik et al. | 99—139 |
| 3,210,198 | 10/1965 | Keller | 99—139 |

FOREIGN PATENTS

| 1,072,768 | 6/1967 | Great Britain | 99—139 |

OTHER REFERENCES

Spanish Cream or Molded Custard, Knox Gelatin, 1927, p. 24.

RAYMOND N. JONES, Primary Examiner

J. M. HUNTER, Assistant Examiner

U.S. Cl. X.R.

99—139